(12) United States Patent
Yang

(10) Patent No.: US 9,350,057 B2
(45) Date of Patent: May 24, 2016

(54) BATTERY PACK INJECTED WITH PHASE CHANGE MATERIAL

(71) Applicant: Microvast Power Systems Co., Ltd.

(72) Inventor: Congming Yang, Huzhou (CN)

(73) Assignee: MICROVAST POWER SYSTEMS CO., LTD., Huzhou, Zhejiang Province (CN)

( * ) Notice: Subject to any disclaimer, the term of this patent is extended or adjusted under 35 U.S.C. 154(b) by 49 days.

(21) Appl. No.: 14/447,300

(22) Filed: Jul. 30, 2014

(65) Prior Publication Data

US 2015/0086832 A1    Mar. 26, 2015

(30) Foreign Application Priority Data

Sep. 24, 2013 (CN) .......................... 2013 1 0438765

(51) Int. Cl.
| | |
|---|---|
| *H01M 2/08* | (2006.01) |
| *H01M 10/659* | (2014.01) |
| *H01M 10/6551* | (2014.01) |
| *H01M 2/10* | (2006.01) |
| *H01M 10/6554* | (2014.01) |
| *H01M 10/04* | (2006.01) |

(52) U.S. Cl.
CPC .......... *H01M 10/659* (2015.04); *H01M 2/1077* (2013.01); *H01M 10/6551* (2015.04); *H01M 10/6554* (2015.04); *H01M 10/0481* (2013.01); *H01M 2220/20* (2013.01)

(58) Field of Classification Search
CPC .............................. H01M 2/08; H01M 10/659
See application file for complete search history.

(56) References Cited

U.S. PATENT DOCUMENTS

| | | | | |
|---|---|---|---|---|
| 2010/0258975 A1* | 10/2010 | Goda | .................. | B29C 45/2602 264/272.21 |
| 2011/0070474 A1* | 3/2011 | Lee | ........................ | B60L 3/0046 429/120 |
| 2011/0262793 A1* | 10/2011 | Reis | .................... | H01M 2/0237 429/120 |

FOREIGN PATENT DOCUMENTS

WO    WO 2011105256    *    9/2011

* cited by examiner

*Primary Examiner* — Stewart Fraser
*Assistant Examiner* — Olatunji Godo
(74) *Attorney, Agent, or Firm* — Cheng-Ju Chiang

(57) ABSTRACT

The present invention provides a battery pack injected with phase change material, comprising a plurality of battery modules consisting of a plurality of stacked battery cells and a pack case housing the battery modules. The battery pack is hermetic, and injected with hydrofluoroether. The pressure in the pack case is between −0.09 MPa and −0.01 MPa.

11 Claims, 2 Drawing Sheets

BATTERY PACK INJECTED WITH PHASE CHANGE MATERIAL

This application claims priority as per Paris Convention based upon the Chinese patent Filed on Sep. 24, 2013 with the Chinese patent office having application number 201310438765.9, the content of which is hereby incorporated herein by references in entirely.

FIELD OF THE INVENTION

The present invention relates generally a battery pack system, more specifically the present invention relates to a battery pack injected with phase change material.

BACKGROUND

As the global energy crisis and environment pollution become more and more serious, a new solution must be adopted in the development of the automobile industry. Electric vehicles are gradually attracting public attention due to its advantage of higher voltage, higher specific energy, better cycling performance and pollution free feature. Further, electric vehicles considered as the most promising automotive vehicles.

However, the lithium ion batteries of an electric vehicle need to operate in a certain temperature range to perform in its optimal state. Operating out of the certain temperature range affects the performance of battery and shortens the battery life. Operating at a higher temperature will reduces the battery safety level, and may further lead to gas releasing, smoking and liquid leaking. More seriously, it may lead to fire or unwanted combustion. Therefore, the temperature control of the lithium ion battery is critical.

The power battery generates a lot of heat during charging and discharging. If the heat cannot be removed in time, the battery temperature will rise significantly. Especially for large storage battery packs, since in order to achieve higher energy density, more heat will be generated and accumulated, thereby causing thermal runaway.

The Chinese patent application No. CN200880127749 discloses a battery pack with a heat-transfer medium introduced into the sealed pack. The technical solution of this invention is: the heat-transfer medium, with a boiling point less than 80° C., is introduced into the space between the battery cells, and the interior of the battery case is the vacuum state. However, the best working condition and proper heat-transfer medium are not disclosed. Actually, although using the same heat-transfer medium, the heat transfer efficiencies are dramatically different under different vacuum conditions. The shape and the structure of the pack case directly influence the heat dissipation effect, and may not be able to meet the heat dissipation requirement.

Therefore to address the above inefficiency, it is desirous to have a battery pack injected with a phase change material.

SUMMARY OF THE INVENTION

The present invention will now be described more specifically with reference to the following embodiments. It is to be noted that the following descriptions of preferred embodiments of this invention are presented herein for the purpose of illustration and description only. It is not intended to be exhaustive or to be limited to the precise form disclosed.

The detailed descriptions of this current invention set forth below in connection with the drawings and examples are preferred embodiments of the current invention and are not limited to represent the only embodiments and forms described hereinafter.

The present invention provides a battery pack injected with phase change material.

The present invention provides a battery pack injected with phase change material wherein pressure in the pack case is preset between a predetermined pressure range to achieve a phase change.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
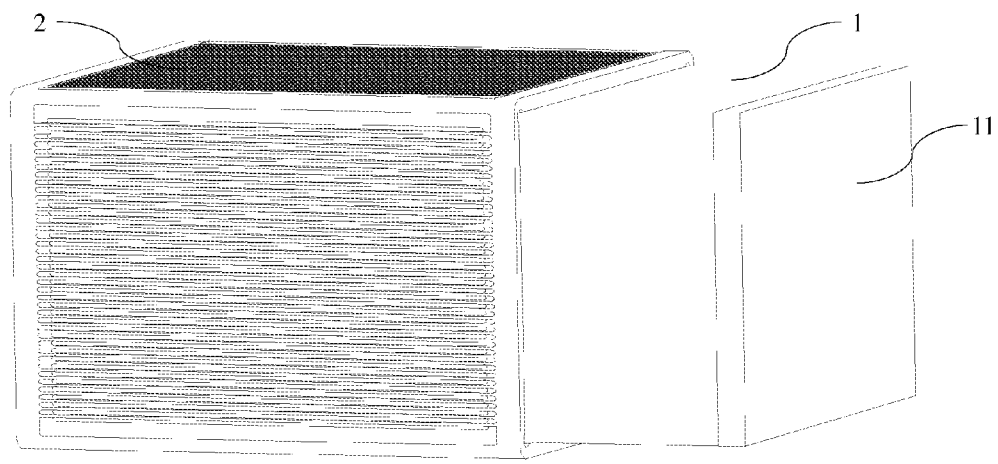
FIG. 1 is a schematic diagram of the battery pack injected with phase change material.

Wherein, 1. battery modules, 11. endplate, 2. pack case, 21. mounting groove, 22. stopper, 23. sealing component, 24. thermal conductive layer, 25. cooling fins.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in a battery pack injected with phase change material. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof. It will be understood that, although the terms first, second, etc. may be used herein to describe various elements, these elements should not be limited by these terms. These terms are only used to distinguish one element from another.

Embodiments will now be described more fully with reference to the accompanying drawings, in which exemplary embodiments are shown. Like reference numerals refer to like elements throughout. In the drawings, the same or corresponding elements are denoted by the same reference numerals, and a repeated explanation thereof will not be given.

EXAMPLE 1

With reference to FIG. 1, the present invention provides a battery pack injected with a phase change material, comprising a plurality of battery modules 1 and a pack case 2, the battery modules 1 comprises of a plurality of stacked battery cells, and the battery modules 1 are held in the pack case 2. The barrel pack case 2 may be formed by four aluminum plates.

Figure 2:
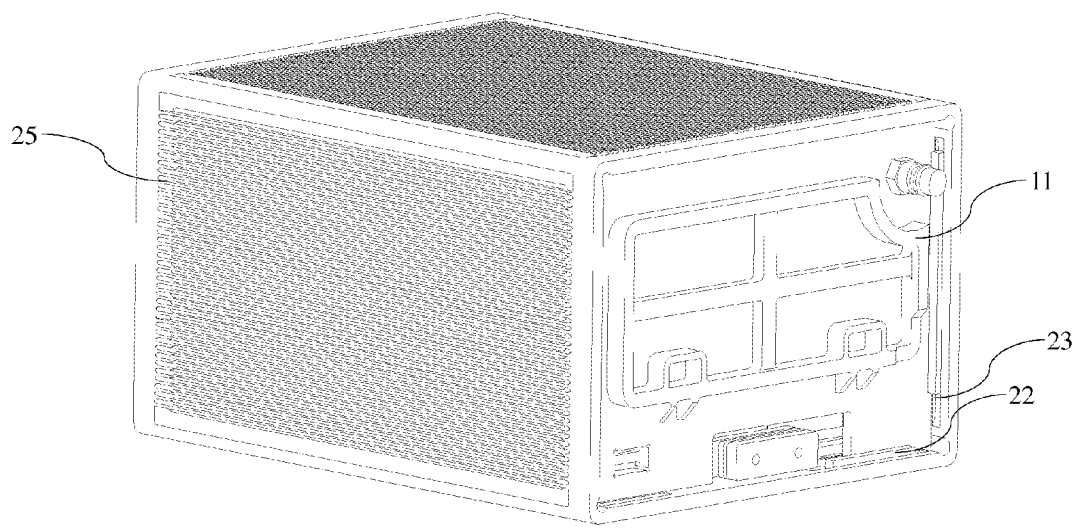
FIG. 2 is a schematic diagram of the battery pack injected with phase change material.
Figure 3:
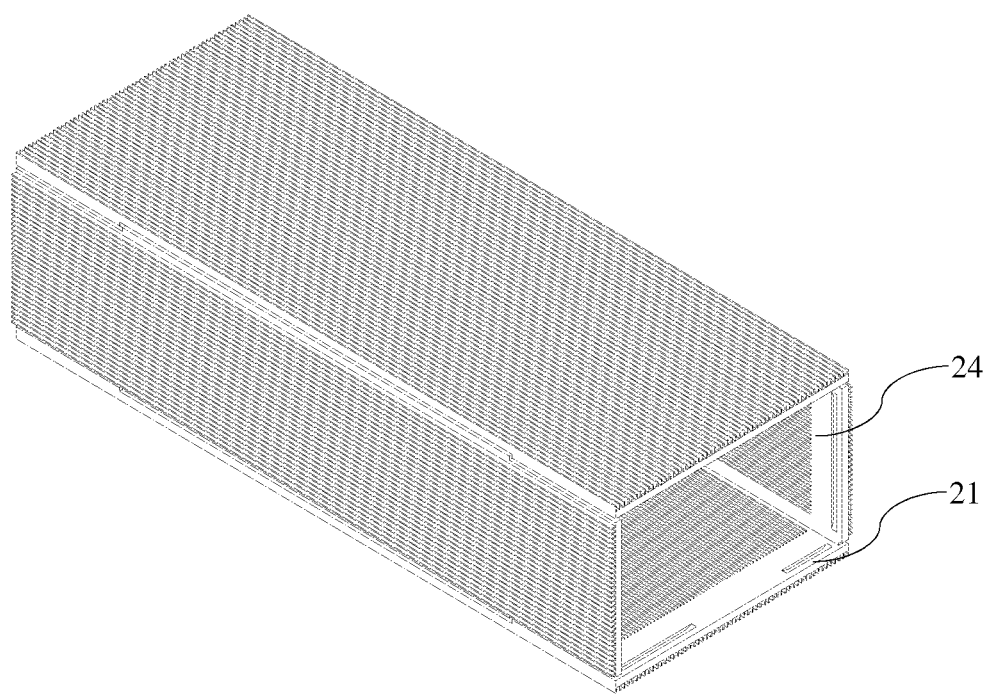
FIG. 3 is a schematic diagram of the pack case.

With reference to FIG. 2 and FIG. 3, mounting grooves 21 are formed or built in the four aluminum plates of the pack case 2 and adjacent to the open ends of the four aluminum plates. Coupled stoppers 22 are installed in the mounting grooves 21. Endplates 11 are installed on both sides of the battery modules 1. The endplates 11 are fixed by the combination of the mounting grooves 21 and the stoppers 22, and thus the battery modules 1 cannot stretch out of the pack case 2. A thermal conductive layer 24 is built on the internal surface of the pack case 2. The thermal conductive layer 24 may be a rough metal coating.

The spring interlayers are built between the adjacent battery cells. During assembly, the endplates 11 are pressed hard to make the spring interlayers between the battery cells in the contraction state. Afterwards, the battery modules 1 are put into the pack case 2. Release the pressure on the spring interlayers, the battery modules 1 is pressed by the spring layers and further stabilized or fixed by the stoppers 22 in the mounting grooves 21. Hence the battery modules 1 are stabilized or fixed in the pack case 2. The spring interlayers may be rubber interlayers.

The sealing component 23 is placed in the gap between the two endplates 11 and the pack case 2. The sealing component 23 comprises an internal layer and an outer layer, the internal layer may be a dry rubber layer and the outer layer may be a glue layer. The dry rubber layer is coated with the glue layer and the glue layer is filled into the gap to ensure the sealing of the pack case 2. Finally some hydrofluoroether is added into the pack case 2, and vacuum the pack case 2 until the pressure in the pack case 2 is at about −0.05 Megapascal (hereinafter Mpa). The boiling point of hydrofluoroether is about 35° C., at which temperature the battery pack have excellent heat dissipation effect. Cooling fins 25 are installed on the outer surface of the pack case 2.

EXAMPLE 2

With reference to FIG. 1, the present invention provides a battery pack injected with phase change material, comprising a plurality of battery modules 1 and a pack case 2. The battery modules 1 has a plurality of stacked battery cells. The battery modules 1 are held in the pack case 2. The pack case 2 is formed by four aluminum plates.

With reference to FIG. 2 and FIG. 3, mounting grooves 21 are installed in the four aluminum plates of the pack case 2 and adjacent to the open ends of the four aluminum plates. Coupled stoppers 22 are provided in the mounting grooves 21. The endplates 11 are built on both sides of the battery modules 1. The endplates 11 are stabilized or fixed by the combination of the mounting grooves 21 and the stoppers 22, so that the battery modules 1 cannot stretch out of the pack case 2. A thermal conductive layer 24 is placed on the internal surface of the pack case 2. The thermal conductive layer 24 is rough metal coating.

The spring interlayers are placed between the adjacent battery cells. In the process of assembly, press hard on the endplates 11 and make the spring interlayers contract. Afterwards, the battery modules 1 will be put into the pack case 2. Release the pressure on the spring layer, the battery modules 1 is pressed by the spring layer and fixed by the stoppers 22 in the mounting grooves 21. Hence the battery modules 1 are fixed in the pack case 2. The spring interlayers are rubber interlayer.

The sealing component 23 is placed in the gap between the two endplates 11 and the pack case 2. The sealing component comprises an internal layer and an outer layer. The internal layer is a dry rubber layer and the outer layer is a glue layer. The dry rubber layer is coated with the glue layer and the glue layer is filled into the space to ensure the sealing of the pack case 2. Finally some hydrofluoroether is added into the pack case 2, and vacuum is applied on the pack case 2 until the pressure in the pack case 2 is at about −0.07 MPa. The boiling point of hydrofluoroether is about 30° C. under this condition, at which temperature the battery pack have excellent heat dissipation effect. The cooling fins 25 are installed on the outer surface of the pack case 2.

EXAMPLE 3

With reference to FIG. 1, the present invention provides a battery pack injected with phase change material, comprising a plurality of battery modules 1 and a pack case 2. The battery modules 1 has a plurality of stacked battery cells, and the battery modules 1 are held in the pack case 2. The pack case 2 is formed by four aluminum plates.

With reference to FIG. 2 and FIG. 3, the mounting grooves 21 are built in the four aluminum plates of the pack case 2 and adjacent to the open ends of the four aluminum plates. The coupled stoppers 22 are installed in the mounting grooves 21. The endplates 11 are installed on both sides of the battery modules 1. The endplates 11 are fixed by the combination of the mounting grooves 21 and the stoppers 22, so that the battery modules 1 cannot stretch out of the pack case 2. A thermal conductive layer 24 is built on the internal surface of the pack case 2. The thermal conductive layer 24 is a rough metal coating.

The spring interlayers are placed between the adjacent battery cells. During assembly, press hard onto the endplates 11 to make the spring interlayers between the battery cells come into contract. Afterwards, the battery modules 1 is put into the pack case 2. Release the pressure on the spring layer, the battery modules 1 is pressed by the spring layer and fixed by the stoppers 22 in the mounting grooves 21. Hence the battery modules 1 are fixed in the pack case 2. The spring interlayers are rubber interlayer.

The sealing component 23 is added in the gap between the two endplates 11 and the pack case 2. The sealing component 23 comprises an internal layer and an outer layer. The internal layer is a dry rubber layer and the outer layer is a glue layer. The dry rubber layer is coated by glue to form the glue layer and the glue layer is filled into the space to ensure the sealing of the pack case 2. Finally some hydrofluoroether is added into the pack case 2, and vacuum the pack case 2 until the pressure in the pack case 2 is at about −0.03 MPa. The boiling point of hydrofluoroether is about 50° C. , at this temperature the battery pack have excellent heat dissipation effect. The cooling fins 25 are built on the outer surface of the pack case 2.

The present invention contemplates using a battery system for a type of electric vehicle. The vehicle may be an all-electric vehicle or a hybrid vehicle.

The present invention provides a battery pack injected with phase change material, comprising a plurality of battery modules consisting of a plurality of stacked battery cells and a pack case housing the battery modules. The battery pack is hermetically sealed, and injected with hydrofluoroether. The pressure in the pack case is between about −0.09 MPa to about −0.01 MPa.

Phase changing material such as Hydrofluoroether is injected in the pack case, and the pack is hermetically sealed. When the pressure in the pack case is between about −0.09 MPa to about −0.01 MPa, the boiling point of hydrofluoroether falls in the range of operating temperature of the battery pack.

Preferably, the pack case comprises a barrel made of four metal plates with two open ends.

The barrel with two open ends is made of four metal plates for easy assembly and high flexibility.

Preferably, mounting grooves are built on the four internal surfaces of the pack case, the mounting grooves are adjacent to the two open ends of the pack case, stoppers are built in the mounting grooves, endplates are installed on both sides of the battery modules, the endplates on both sides of the battery module are anchored by the stoppers, sealing component are installed between the two endplates and the pack case to form a sealed connection.

The mounting grooves are built adjacent to the two open ends of the pack case, and stoppers are built in the mounting grooves. The combination of the stoppers and the mounting grooves is to effectively block and fix the battery modules.

Preferably, the said sealing component comprises an internal layer and an outer layer. The internal layer is a dry rubber layer and the outer layer is a glue layer.

The sealing component with internal layer and outer layer is conducive to the sealing of the pack case. Firstly, the dry rubber layer is built in the gap between the two endplates and the pack case to form a preliminary sealing. And then the glue layer is built on the dry rubber layer to achieve better sealing. If only the glue layer is in place, the glue will flow into the battery pack through the gap causing harmful effects and worsens sealing.

The endplates are installed on both ends of the battery module to prevent the battery units to get in contact with the outside, leading to better security. The sealing component is installed in the gap between the two endplates and the pack case to keep the connection between the pack case and the battery modules sealed.

Preferably, a thermal conductive layer is installed on the internal surface of the pack case. The thermal conductive layer installed on the internal surface of the pack case is beneficial to transfer the heat from inside of the pack to the outer pack case.

Preferably, the thermal conductive layer comprises rough metal coating or metal fins. The rough metal coating or metal fins are employed as thermal conductive layer. Preferably, another set of the cooling fins are provided on the outer surface of the pack case. The cooling fins on the outer surface of the pack case can increase the heat dissipating area of the pack case, and are beneficial to transfer the heat out of the battery pack.

Preferably, the spring interlayers are installed between the battery cells.

According to an embodiment of the present invention, the battery cells are sheet type cells with aluminum plastic packaging film. The spring interlayers between the adjacent battery cells create some space between the battery cells. The endplates are installed at both ends of the battery module. Because the core temperature of the battery module is higher than the temperature of its sides, in our design, the closer the battery cells are to the center of the module, the thicker the spring interlayers become, and vice versa. The core temperature of the battery pack is generally the highest in the whole pack during long time operation. Due to the size limit, it is difficult for the heat to dissipate to the lower temperature section. Increasing the distance between the battery cells close to the core of the battery pack is beneficial to the uniform temperature distribution.

Preferably, the spring interlayer comprises rubber interlayer.

The rubber interlayers as spring interlayers placed between the battery cells to effectively separate the battery cells, and the distance between the adjacent battery cells gradually decreases from the middle to the ends. It is beneficial to the heat dissipation and creates a superior insulation layer.

Preferably, the pressure in the pack case is between about −0.07 MPa to about −0.03 MPa. More preferably, the pressure in the pack case is about −0.05 MPa.

After vacuuming, the pressure in the pack case is maintained at about −0.05 Mpa. The boiling point of hydrofluoroether is known to be about 35° C. in this condition. Typically the optimal operation temperature of the battery pack is between 20° C. and 50° C. When the temperature of the battery pack is at 35° C., the hydrofluoroether liquid gradually changes into gas (phase change). In the process, the thermal energy of the battery pack is absorbed, the pressure in the pack case increases, which reduces the gasification rate of the hydrofluoroether. This process keeps the pressure in the battery pack within a certain limit When the temperature of the battery pack is reduced below the boiling point of hydrofluoroether, the hydrofluoroether condenses and gradually turns back into liquid from gas. Therefore the pressure in the pack case decreases and reaches a dynamic equilibration.

A battery pack injected with a phase change material is provided. The battery pack comprises a plurality of battery modules including a plurality of stacked battery cells and a pack case housing the plurality of battery modules. The battery pack is hermetically sealed and injected with the phase change material. The pressure in the pack case is preset between a predetermined pressure range to achieve a phase change.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," and terms of similar meaning should not be construed as limiting the item described to a given time period or to an item available as of a given time, but instead should be read to encompass conventional, traditional, normal, or standard technologies that may be available now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

What is claimed is:

1. A battery pack injected with a phase change material, comprising a plurality of battery modules including a plurality of stacked battery cells and a pack case housing the plurality of battery modules, the battery pack being hermetically sealed and injected with the phase change material; wherein the phase change material is hydrofluoroether, the pack case is vacuumed and the pressure in the pack case is set in a pressure range from about −0.09 MPa to about −0.01 MPa at which the hydrofluoroether in the pack case undergoes a phase change when the battery cells operate, heat generated by the battery cells is absorbed by the hydrofluoroether when the hydrofluoroether undergoes the phase change and the heat is then dissipated away by the pack case.

2. The battery pack according to claim 1, wherein the pack case comprises a barrel made of four metal plates with two open ends.

3. The battery pack according to claim 2, wherein mounting grooves are built in four internal surfaces of the pack case, the mounting grooves are located adjacent to the two open ends of the pack case, stoppers are installed in the mounting grooves, endplates are installed on both sides of the battery modules, and the endplates on both sides of the battery modules are fixed by the stoppers.

4. The battery pack according to claim 3, wherein a sealing component is installed between the two endplates and the pack case to form a sealing connection, the sealing component comprises an internal layer and an outer layer, with the internal layer being a dry rubber layer and the outer layer being a glue layer.

5. The battery pack according to claim 1, wherein a thermal conductive layer is installed on the internal surface of the pack case.

6. The battery pack according to claim 5, wherein the thermal conductive layer comprises rough metal coating or metal fins.

7. The battery pack according to claim 1, wherein cooling fins are installed on the outer surface of the pack case.

8. The battery pack according to claim 1, wherein spring interlayers are added between the battery cells.

9. The battery pack according to claim 8, wherein the spring interlayer comprises a rubber interlayer.

10. The battery pack according to claim 1 wherein the pressure in the pack case is set from about −0.07 MPa to about −0.03 MPa.

11. The battery pack according to claim 10, wherein the pressure in the pack case is set at about −0.05 MPa.

* * * * *